United States Patent
Kang et al.

(10) Patent No.: US 11,924,860 B2
(45) Date of Patent: Mar. 5, 2024

(54) SYSTEMS AND METHODS FOR OFFLOADING COMPUTING TASKS FROM VEHICLES USING CHARACTERISTICS

(71) Applicant: Toyota Motor Engineering & Manufacturing North America, Inc., Plano, TX (US)

(72) Inventors: Yuhan Kang, Houston, TX (US); Haoxin Wang, Charlotte, NC (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 237 days.

(21) Appl. No.: 17/388,645

(22) Filed: Jul. 29, 2021

(65) Prior Publication Data
US 2023/0032183 A1 Feb. 2, 2023

(51) Int. Cl.
| | |
|---|---|
| H04W 4/40 | (2018.01) |
| H04L 41/14 | (2022.01) |
| H04L 67/1001 | (2022.01) |
| H04L 67/1008 | (2022.01) |
| H04W 72/04 | (2023.01) |
| H04W 72/52 | (2023.01) |

(52) U.S. Cl.
CPC .......... *H04W 72/52* (2023.01); *H04L 41/145* (2013.01); *H04L 67/1001* (2022.05); *H04W 4/40* (2018.02)

(58) Field of Classification Search
None
See application file for complete search history.

(56) References Cited

U.S. PATENT DOCUMENTS

| | | | |
|---|---|---|---|
| 9,066,141 B2 | 6/2015 | Hamedany et al. | |
| 9,336,043 B2 | 5/2016 | Preston | |
| 11,627,528 B2* | 4/2023 | Hu | H04W 52/0219 370/329 |
| 2014/0355542 A1 | 12/2014 | Zhang | |
| 2019/0047581 A1* | 2/2019 | Bai | G06F 9/5027 |
| 2019/0132709 A1* | 5/2019 | Graefe | G08G 1/096716 |

(Continued)

OTHER PUBLICATIONS

Li et al., "Resource Allocation for NOMA-MEC Systems in Ultra-Dense Networks: A Learning Aided Mean-Field Game Approach," IEEE Transactions on Wireless Communications, vol. 20, No. 3, Mar. 2021, pp. 1487-1500.

(Continued)

*Primary Examiner* — Duc T Duong
(74) *Attorney, Agent, or Firm* — Christopher G. Darrow; Darrow Mustafa PC (57) ABSTRACT

System, methods, and other embodiments described herein relate to selecting servers and allocating resources concurrently for offloading computing tasks from vehicles. In one embodiment, a method includes acquiring characteristics of a vehicle and a server for an offloading request, wherein the offloading request is associated with a computing task of the vehicle. The method also includes, upon satisfying criteria for optimization associated with executing the computing task remotely, determining server selection and resource allocation by processing the characteristics using modeling. The method also includes communicating the server selection and the resource allocation to the vehicle.

20 Claims, 5 Drawing Sheets

(56) References Cited

U.S. PATENT DOCUMENTS

| | | | | |
|---|---|---|---|---|
| 2020/0008044 | A1* | 1/2020 | Poornachandran | ............................ H04L 41/5019 |
| 2020/0178198 | A1* | 6/2020 | Ding | ..................... H04W 60/04 |
| 2022/0050725 | A1* | 2/2022 | Gehrling | ............... G06F 9/5038 |
| 2022/0210686 | A1* | 6/2022 | Zhang | ................. H04L 41/0833 |
| 2023/0040264 | A1* | 2/2023 | Hu | ........................... H04L 67/12 |

OTHER PUBLICATIONS

Xiao et al., "A Bilateral Game Approach for Task Outsourcing in Multi-access Edge Computing," arXiv:2008.11617, Aug. 26, 2020, pp. 1-13.

Yan et al., "Game Theory based Joint Task Offloading and Resources Allocation Algorithm for Mobile Edge Computing," 2020 16th International Conference on Mobility, Sensing and Networking (MSM), 2020, pp. 791-796.

Fang et al., "An Efficient Resource Allocation Strategy for Edge-Computing Based Environmental Monitoring System," Sensors 2020, 20, pp. 1-16.

Masdari et al., "Efficient Offloading Schemes using Markovian Models: a literature review," Computing 2020, vol. 102, issue 7, pp. 1673-1716.

Wang et al., "Joint D2D Collaboration and Task Offloading for Edge Computing: A Mean Field Graph Approach," arXiv:2105.00766, May 6, 2021, pp. 1-15.

Moura et al., "Game Theory for Multi-Access Edge Computing: Survey, Use Cases, and Future Trends," in IEEE Communications Surveys & Tutorials, vol. 21, No. 1, 2019, pp. 1-39.

Cheng et al., "Efficient Resource Allocation for NOMA-MEC System in Ultra-dense Network: A Mean Field Game Approach," 2020 IEEE International Conference on Communications Workshops (ICC Workshops), 2020, pp. 1-6.

Chow et al., "Population games and discrete optimal transport," Journal of Nonlinear Science, vol. 29, issue 3, Apr. 4, 2017, pp. 871-896.

* cited by examiner

SYSTEMS AND METHODS FOR OFFLOADING COMPUTING TASKS FROM VEHICLES USING CHARACTERISTICS

TECHNICAL FIELD

The subject matter described herein relates, in general, to offloading computing tasks, and, more particularly, to selecting servers and allocating resources for the tasks using characteristics of vehicles and servers.

BACKGROUND

Vehicles process complex computing tasks, such as for depth estimation, in an intelligent transportation system (ITS). In one approach, an ITS includes an application in a vehicle providing services for transport and traffic management (e.g., coordinated driving). These services may include automated driving that involve tasks to control the vehicle. For example, automated driving systems (ADS) may process computing tasks to detect objects in a driving environment and safely maneuver the vehicle. On-board vehicle systems that process acquired data for the object detection and tracking may cause delays for the automated driving. Such delays are caused by the size or complexity of a computing task. Accordingly, vehicles utilize servers to reduce latency and leverage computing resources by offloading and remotely executing the computing task.

In various implementations, server assignment of computing tasks from vehicles impacts network latency. Schemes for allocating network resources also affect server performance. For example, a server in a geographic area can be overloaded or underutilized due to inefficient resource allocation during specific times (e.g., rush hour) that cause fluctuations. In another example, an automated vehicle offloading tasks for object detection can overuse server resources causing critical delays for an emergency vehicle responding to a call using the same server resources. Furthermore, efficiently determining server assignment and allocating resources for offloading computing tasks may also be difficult in a dense area of servers and vehicles. Thus, network latency and computation times increase for selecting servers and allocating resources according to the density.

SUMMARY

In one embodiment, example systems and methods relate to selecting servers and allocating resources concurrently for offloading computing tasks from vehicles. In various implementations, assigning edge servers and allocating network resources in a transportation system that is networked can be inefficient for dense vehicle and server areas. For example, offloading demands increase during rush hour in a dense area. As such, the end-to-end latency of an edge server executing the computing task may substantially increase. Furthermore, allocating resources encounters difficulties for computing tasks from heterogeneous (e.g., automated vehicles, emergency vehicles, etc.) and fluctuating computing sources. Therefore, in one embodiment, an optimization system uses characteristics (e.g., task size, server capacity, etc.) and modeling to reduce concurrent server selection and allocation times for remotely executing the computing tasks. In one approach, a mean-field evolution (MFE) model estimates agent behavior in a group for the modeling. In particular, agents may be dynamic servers and vehicles that are irrational. Here, the MFE model concurrently mediates groups having diverse agents and behaviors according to the characteristics. The optimization system then utilizes a probability distribution (e.g., Gaussian) for rapidly allocating servers independent of area density or agent quantities. As such, the optimization system uses the MFE model for improving server selection and resource allocation times for offloading, irrespective of numerous servers or heterogeneous vehicles in an area.

In various implementations, the optimization system also pre-sorts offloading requests for prioritization and bypassing the MFE modeling. For example, the optimization system may determine whether an offloading request satisfies criteria for performing the MFE modeling of the system characteristics. The criteria factors in priority level (e.g., emergency vehicle) or resources pre-reserved for the offloading request. Accordingly, the optimization system uses pre-sorting and the MFE modeling of offloading requests for reducing latency and improving server management.

In one embodiment, an optimization system for selecting servers and allocating resources for offloading computing tasks from vehicles is disclosed. The optimization system includes a processor and memory storing instructions that, when executed by the processor, cause the processor to acquire characteristics of a vehicle and a server for an offloading request, wherein the offloading request is associated with a computing task of the vehicle. The instructions also include instructions to, upon satisfying criteria for optimization associated with execution of the computing task remotely, determine server selection and resource allocation by processing the characteristics using modeling. The instructions also include instructions to communicate the server selection and the resource allocation to the vehicle.

In one embodiment, a non-transitory computer-readable medium for selecting servers and allocating resources for offloading computing tasks from vehicles and including instructions that when executed by a processor cause the processor to perform one or more functions is disclosed. The instructions include instructions to acquire characteristics of a vehicle and a server for an offloading request, wherein the offloading request is associated with a computing task of the vehicle. The instructions also include instructions to, upon satisfying criteria for optimization associated with execution of the computing task remotely, determine server selection and resource allocation by processing the characteristics using modeling. The instructions also include instructions to communicate the server selection and the resource allocation to the vehicle.

In one embodiment, a method for offloading tasks is disclosed. In one embodiment, the method includes acquiring characteristics of a vehicle and a server for an offloading request, wherein the offloading request is associated with a computing task of the vehicle. The method also includes, upon satisfying criteria for optimization associated with executing the computing task remotely, determining server selection and resource allocation by processing the characteristics using modeling. The method also includes communicating the server selection and the resource allocation to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with selecting servers and allocating resources concurrently for offloading computing tasks from vehicles are disclosed herein. In various implementations, assigning edge servers and allocating network resources in a geographic area can be inefficient due to request density, varying offloading demands. Therefore, in one embodiment, an optimization system acquires characteristics (e.g., task size, server bandwidth, etc.) of vehicles and servers for offloading requests. The optimization system sorts or uses modeling to allocate server resources. For example, various vehicle types (e.g., automated vehicle, emergency vehicles, etc.) in an area transmit the offloading requests for executing complex tasks. Object detection and motion estimation are examples of complex tasks. In particular, modeling may be performed for requests mostly from homogeneous agents. Agents are servers and vehicles that are irrational and changing dynamically. Emergency vehicles can generate tasks that make offloading activity heterogeneous. As such, the optimization system improves efficiency using pre-sorting and inputting to the model homogeneous tasks from an agent group. Thus, the optimization system can bypass modeling and allocate resources associated with emergencies by pre-sorting.

Upon satisfying criteria for modeling, the optimization system determines server selection and resources using the characteristics by modeling. For example, the optimization system uses mean-field evolution (MFE) modeling encompassing a mean-field equation and an evolving probability distribution function (PDF). MFE can rapidly process different numbers of agents (e.g., a vehicle or a server) to minimize cost (e.g., end-to-end latency). Here, the PDF may represent data sizes of voluminous tasks about various agents or agent groups operating in a dense area. The mean-field utilizes evolution to control various agent types, such as vehicles and servers, and dynamic changes within an agent group. In one approach, the MFE model outputs a parameter representing the proportion of a vehicle task assigned to a server and a computation resource allocated to the server for controlling resource allocation. In this way, the optimization system efficiently and rapidly determines server selection and resources regardless of the density or agent type associated with offloading demands.

Figure 1:
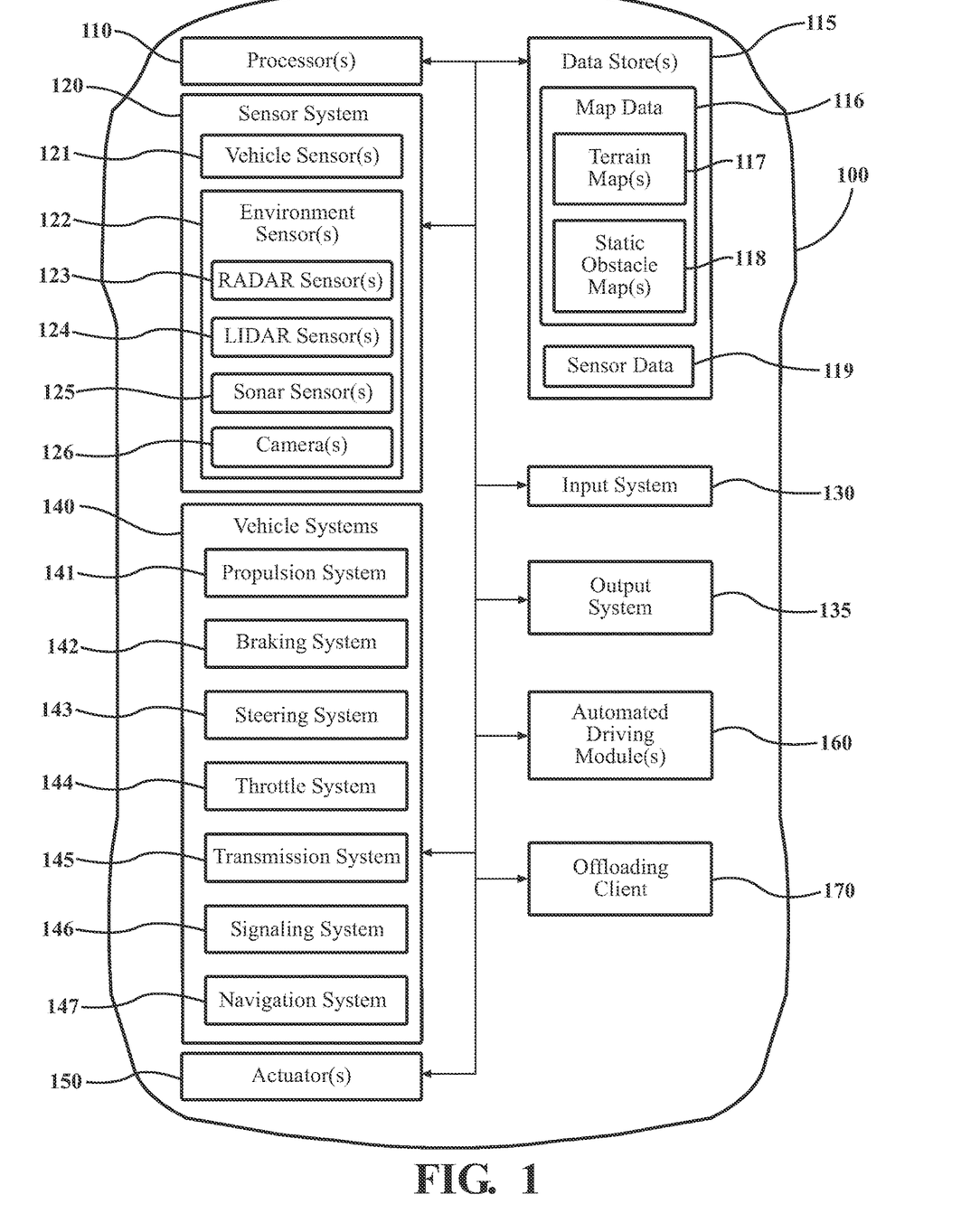
FIG. 1 illustrates one embodiment of a vehicle within which systems and methods disclosed herein may be implemented.

Now referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 is any robotic device or form of motorized transport that benefits from the functionality discussed herein associated with selecting servers and allocating resources concurrently for offloading computing tasks from vehicles.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 uses the offloading client 170 to communicate with an optimization system 200 in FIG. 2. The optimization system 200 may be implemented to perform methods and other functions as disclosed herein relating to selecting servers and allocating resources concurrently for offloading computing tasks from vehicles.

Figure 2:
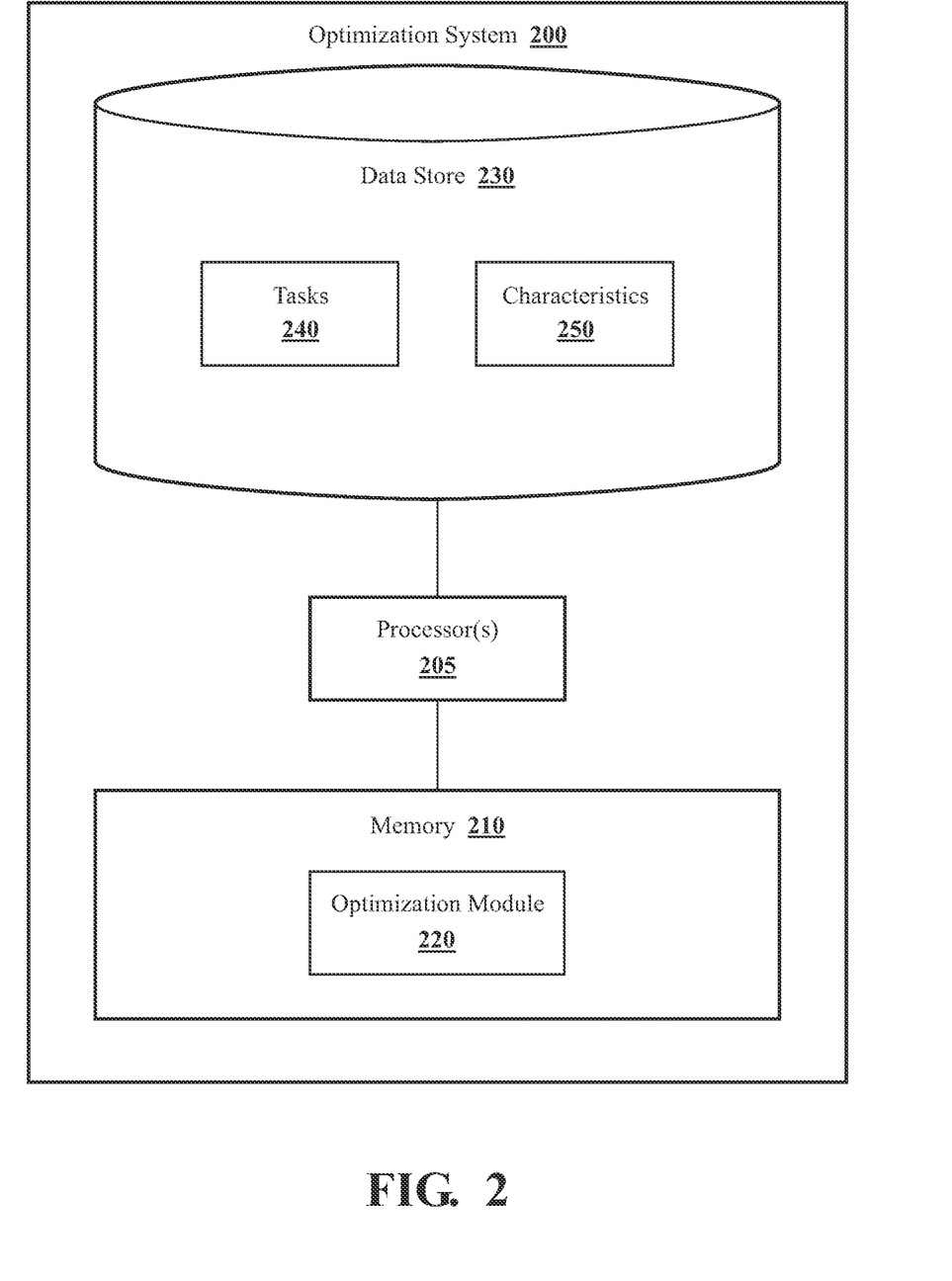
FIG. 2 illustrates one embodiment of an optimization system that is associated with sorting and modeling to select servers and allocate resources concurrently for offloading computing tasks from vehicles.

Referring to FIG. 2, the figure illustrates one embodiment of an optimization system 200 that is associated with offloading computing tasks within the vehicle of FIG. 1 to execute on a server. In various implementations, the server is an edge server, a cloud server, or other server available for remotely executing computing tasks from the vehicle 100. The optimization system 200 is shown as including a processor 205. For example, the processor 205 can be an application-specific integrated circuit (ASIC), a microprocessor, a microcontroller, a field-programmable gate array (FPGA), a multi-core processor, or the like. The optimization system 200 may communicate with the offloading client 170 for receiving offloading requests related to computations within the vehicle 100. In one approach, the optimization system 200 assigns a computing task, such as object detection, associated with offloading requests for remote execution by one or more servers.

Moreover, the optimization system 200 is shown as including a processor(s) 205. In one embodiment, the optimization system 200 includes a memory 210 that stores an optimization module 220. The memory 210 is a random-access memory (RAM), read-only memory (ROM), a hard-disk drive, a flash memory, or other suitable memory for storing the optimization module 220. The optimization module 220 is, for example, computer-readable instructions that when executed by the processor(s) 205 cause the processor(s) 205 to perform the various functions disclosed herein.

Moreover, in one embodiment, the optimization system 200 includes a data store 230. In one embodiment, the data store 230 is a database. The database is, in one embodiment, an electronic data structure stored in the memory 210 or another data store and that is configured with routines that can be executed by the processor(s) 205 for analyzing stored data, providing stored data, organizing stored data, and so on. Thus, in one embodiment, the data store 230 stores the tasks 240 and characteristics 250 used by the optimization module 220 in executing various functions. The tasks 240 may be computing tasks associated with depth perception, object detection, motion estimation, and on related to vehicles in a geographic area requesting remote execution. As explained further below, the characteristics 250 may be a task size, a transmitter power, an emergency level, a size of computing resources, a reservation level, a timestamp, server bandwidth, and server computing capacity. The optimization system 200 uses the characteristics 250 to efficiently select servers and allocate computing resources, such as through modeling.

In further aspects, the optimization module 220 also includes instructions that cause the processor 205 to acquire the characteristics 250 associated with an offloading request. The optimization system 200 using sorting or modeling then determines server selection and resource allocation by processing the characteristics 250. The model mediates and aggregates behaviors of individual agents according to the characteristics 250 and manages offloading demands accordingly. For example, the optimization system 200 pre-sorts or groups agents according to an emergency level and task size. In one approach, the optimization system 200 utilizes the model to minimize cost according to system constraints. A cost may be an expected end-to-end latency for vehicles in a geographic area. A system constraint can be server resources available or a number of tasks awaiting assignment. In this way, the optimization system 200 improves efficiency by reducing server overload and resource hogging.

In various implementations, an MFE model is used for modeling. Unlike linear systems, MFE uses a numerical process through a mean-field equation and a distribution or a PDF that evolves. A benefit of MFE is processing data sets of small to infinite sizes with similar performance and speeds. The distribution of the MFE may represent data sizes of voluminous tasks about various agents or agent groups. Regarding evolution, the optimization system 200 can utilize evolution to control various agent types, such as vehicles and servers, and dynamic changes within an agent group. For example, a vehicle and a server have different characteristics and behaviors in an offloading environment that the MFE weighs through evolution. As explained below, the MFE model also utilizes game theory to fairly determine server selection and resources for a geographic area. In this way, the optimization system 200 efficiently and rapidly determines server selection and resources through modeling regardless of the volume associated with offloading demands.

Figure 3:
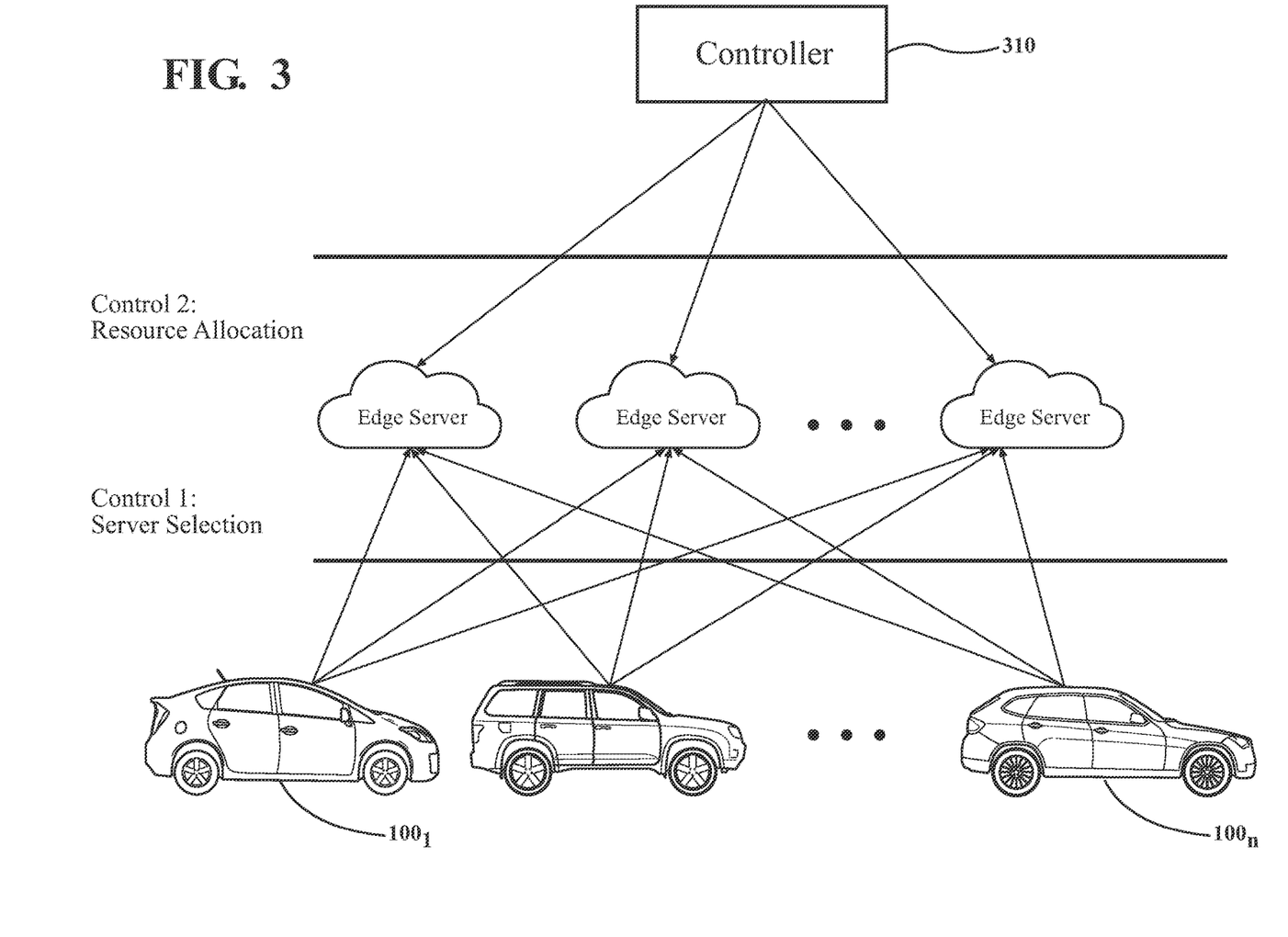
FIG. 3 illustrates an example of a geographic area having various server and vehicle types.

Moreover, agents may be dynamic servers and vehicles located in a geographic area. FIG. 3 illustrates an example of a geographic area having various server and vehicle types. A controller 310 utilizes the optimization system 200 to select an edge server and allocate resources of the edge server. In one approach, modeling using MFE optimizes offloading demands according to a vehicle grouping and a separate server grouping. This may improve modeling by the MFE since the behaviors and PDF of tasks are different for vehicles and servers. Accordingly, the optimization system 200 uses the MFE model to reduce server selection and resource allocation times for servicing offloading demands from vehicles independent of density within a geographic area.

Figure 4:
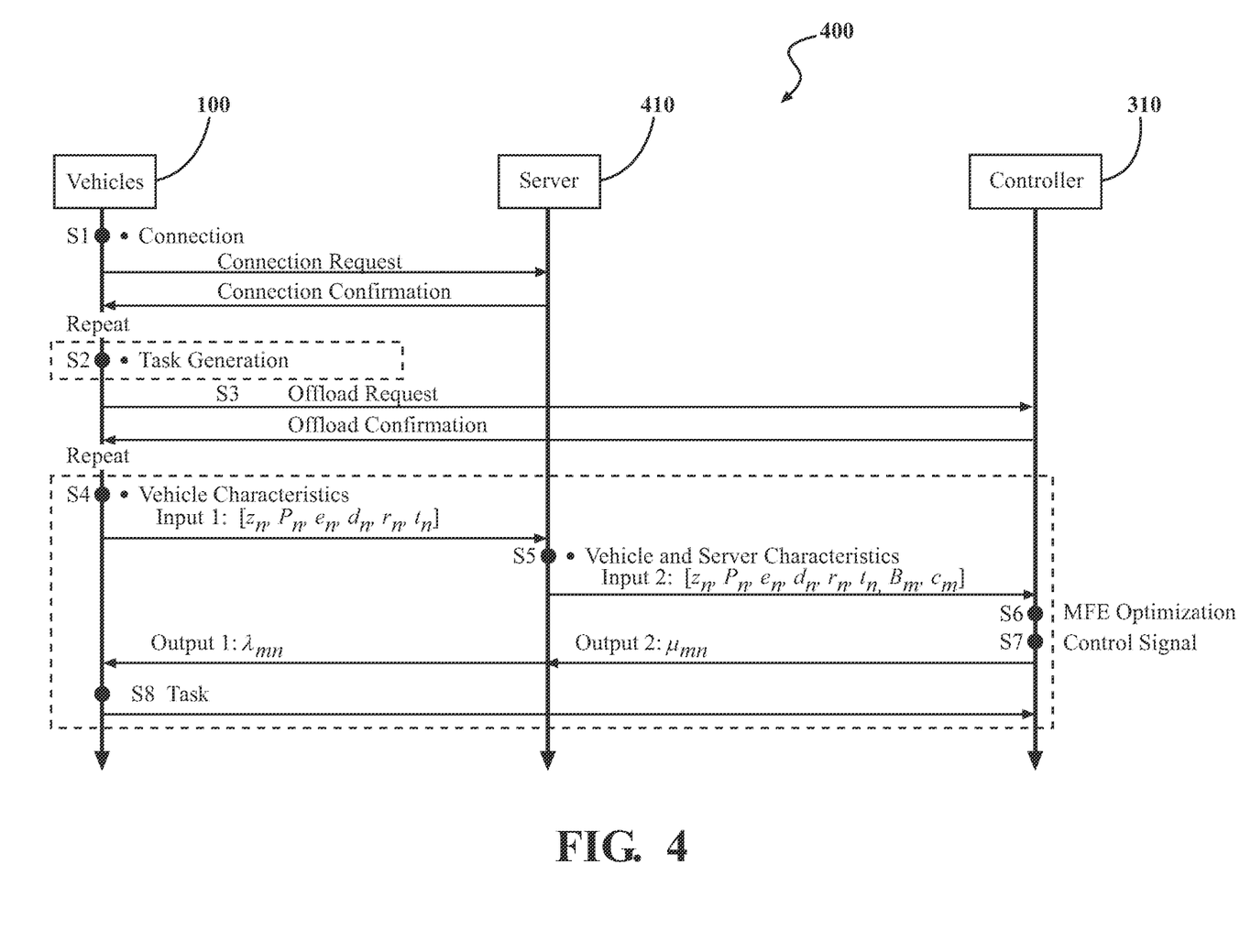
FIG. 4 illustrates a signaling diagram to select servers and allocate resources concurrently for offloading computing tasks within a geographic area.

FIG. 4 illustrates a signaling diagram 400 to select servers and allocate resources concurrently for offloading computing tasks in a geographic area. A connection process (S1) involves the vehicle 100 transmitting a connection request to a server 410, such as an edge or cloud server. In response, the server 410 transmits a connection confirmation if the server is available. The vehicle 100 generates a task subsequent to the connection confirmation (S2). For example, the task is a computing task associated with depth perception, object detection, or motion estimation.

Task generation repeats until the vehicle requires offloading, such as due to complexity or a size of a computing task. Accordingly, the vehicle 100 transmits an offload request to the controller 310 through an offloading process (S3) with the connected server. The controller 310 grants or denies the offload request according to system status, resource availability, a request type, the task type, and so on. The offloading process repeats until the vehicle receives an offload confirmation.

Next, vehicles $100_1$-$100_n$ transmit characteristics (S4) as Input 1 for a model performing server selection and resource allocation. For example, the Input 1 is [$z_n$, $P_n$, $e_n$, $d_n$, $r_n$, $t_n$] for vehicle n. The parameters represent: task size z; transmitter power P; emergency level e; resource size of computing demand d; reservation level r; and timestamp t. For the optimization system 200 to determine homogeneity (i.e., uniqueness) and group agents, the task size z (e.g., object detection of 1 gigabit (Gb)) may be utilized. The transmitter power P, in various implementations, can also vary among vehicle manufacturers. Accordingly, the optimization system 200 may also use this parameter for the optimization system 200 to determine homogeneity. To complete the modeling inputs, a server m may add bandwidth B and computation resource capacity c to form Input 2 as [$z_n$, $P_n$, $e_n$, $d_n$, $r_n$, $t_n$, $B_m$, $c_m$]. The server transmits Input 2 (S5) as the combined vehicle and server characteristics and system constraints to the controller 310.

Next, the controller 310 performs pre-sorting or pre-selection for remotely executing the task prior to modeling. For example, modeling is performed for requests mostly from a homogeneous pool of agents (e.g., vehicles). However, tasks from emergency vehicles may result in offloading activity that is heterogeneous. Here, a heterogeneous group includes automated vehicles, emergency vehicles, and manual passenger vehicles since each has unique offloading demands. As such, pre-sorting improves request optimization by forwarding homogenous tasks alone from a group, such as from a pool of passenger vehicles without emergency vehicles. If the criteria are unmet, the controller 310 bypasses modeling and allocates substantial resources for the computing task. This may occur if the reservation level $r_n$ indicates an emergency. In another example, substantially all available computing resources and radio bandwidth for a timeslot needed to execute object detection are allocated. Accordingly, the controller 310 bypasses modeling and releases substantial resources immediately that are pre-reserved at the timestamp $t_n$.

As such, the controller 310 performs modeling (S6) using the Input 2. As explained above, the optimizations system 200 bypasses modeling if criteria (e.g., a critical demand) are unmet. When satisfying the criteria for modeling to execute the computing task, in various implementations, the controller 310 uses the optimization system 200 to generate output [$\lambda_{mn}$, $\mu_{mn}$] and performs MFE modeling. To optimize server selection and resource allocation, the MFE modeling uses a cost function to minimize the average end-to-end latency of the vehicle 100 with server resources as a constraint. Here, the MFE modeling may utilize a mean-field equation and a PDF that evolves to control the varying agent groups of vehicles n and servers m. The MFE model also reacts to dynamic changes within agent groups. In one approach, the PDF represents data sizes of tasks about various agents the MFE model utilizes to fairly select servers and allocate resources. For example, when vehicle $100_n$ is performing object detection, the optimization system 200 uses MFE modeling to proportionally offload tasks to different edge servers to achieve full capacity. In this way, the optimization system 200 avoids having certain edge servers overloaded while others are under capacity.

In one approach, the MFE model uses game theory for the server selection and resource allocation. In MFE based game theory, the behavior of each player is governed by the rest of the players using a mean-field equation. Accordingly, mean-field game theory can theoretically analyze games with infinite players without detailed state information about all other players. In fact, mean-field games explain that control and optimization are achievable by implementing strategies based on the distribution of the other players. In our case, the MFE model processes agent requests while accounting for density and pool size for offloading demands. Sometimes the behavior and requests of a subgroup of vehicles $100_1$-$100_n$ have a negligible impact on the overall offloading demands. Accordingly, the MFE uses Input 2 to model the dynamics of the subgroup. As such, the subgroup of vehicles $100_1$-$100_n$ is controlled to minimize the cost function without impacting the performance of other vehicles or servers.

Returning to the output, the parameter $\lambda_{mn}$ represents the proportion of the $n^{th}$ vehicle task assigned to the $m^{th}$ edge server for controlling server selection and task assignment. On the other hand, the output $\mu_{mn}$ represents a computation resource allocated to the $n^{th}$ vehicle in the $m^{th}$ edge server for controlling resource allocation. The controller 310 communicates the output to the server 410 and the vehicle 100 in a control signal (S7). In addition to rapid server selection and resources, the optimization system 200 provides joint server selection by concurrently providing both $\lambda_{mn}$ and $\mu_{mn}$. The vehicle $100_n$ communicates the task (e.g., motion estimates) for remote execution to the selected server m (S8) using allocated resources. The server m completes the process by communicating executed results of the task.

Figure 5:
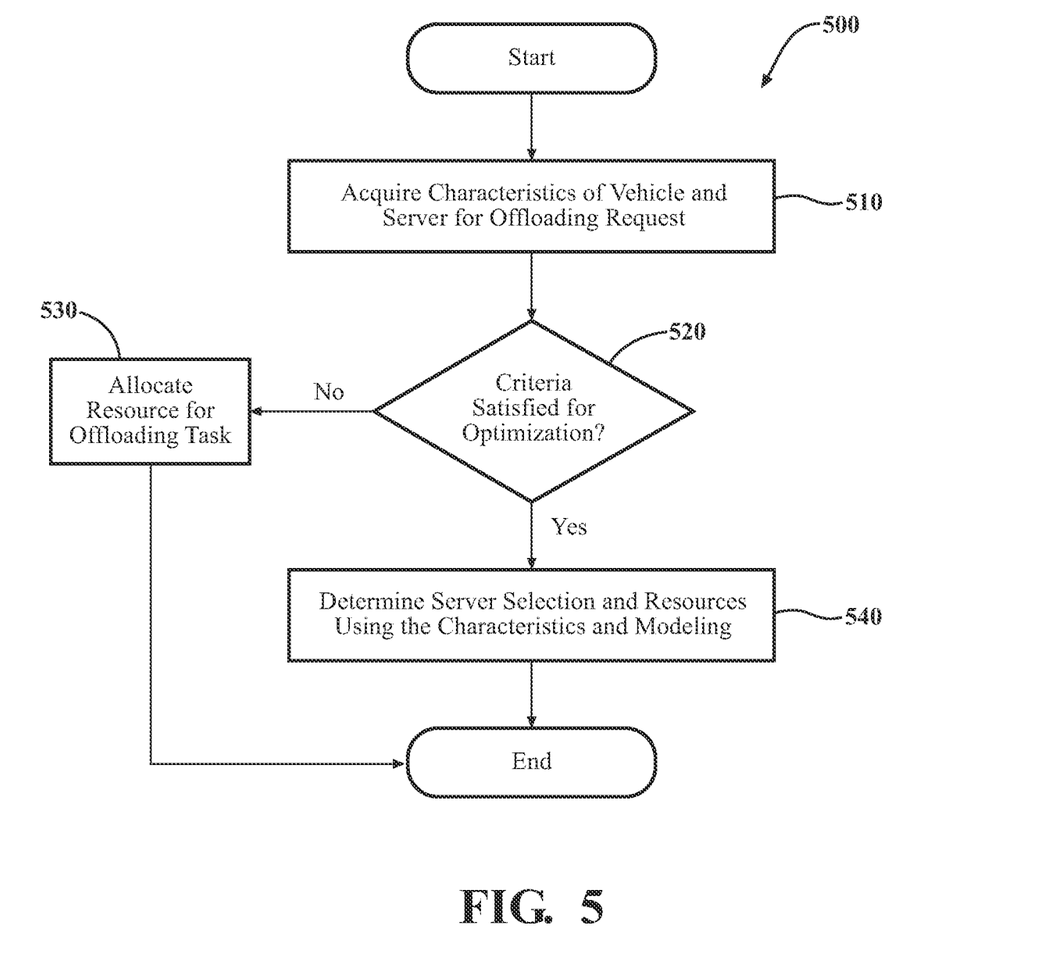
FIG. 5 illustrates one embodiment of a method that is associated with selecting servers and allocating resources concurrently for offloading computing tasks from vehicles.

FIG. 5 illustrates a flowchart of a method 500 that is associated with selecting servers and allocating resources concurrently for offloading computing tasks from vehicles. Method 500 will be discussed from the perspective of the optimization system 200 of FIG. 2. While method 500 is discussed in combination with the optimization system 200, it should be appreciated that the method 500 is not limited to being implemented within the optimization system 200 but is instead one example of a system that may implement the method 500.

At 510, the optimization system 200 acquires characteristics of vehicles and servers associated with offloading requests. As explained above, the vehicles $100_1$-$100_n$ can transmit characteristics [$z_n$, $P_n$, $e_n$, $d_n$, $r_n$, $t_n$]. Similarly, servers 1 to m provides characteristics to form a combined input [$z_n$, $P_n$, $e_n$, $d_n$, $r_n$, $t_n$, $B_m$, $c_m$]. In one approach, the optimization system 200 groups agents (e.g., vehicles) using the task size z (e.g., object detection of 1 gigabit (Gb)) to improve task and server assignment. For example, a cloud server can process task sizes above a certain level more efficiently than an edge server. As such, the cloud server may receive tasks according to size characteristics. Furthermore, the transmitter power P, in various implementations, can vary among vehicle manufacturers. Accordingly, the optimization system 200 may also use this parameter for the optimization system 200 to improve grouping and task assignment.

Next, at 520 the optimization system 200 performs pre-sorting or pre-selection for remotely executing the task prior to modeling. As explained above, modeling can be performed mostly for requests from a homogeneous pool of agents. Agent types are servers and vehicles that are irrational and changing dynamically. Emergency vehicles can generate tasks that make offloading activity heterogeneous. As such, a heterogeneous group may include automated vehicles, emergency vehicles, and manual passenger vehicles since each has unique offloading demands. The optimization system 200 can improve optimization using pre-sorting and modeling primarily of homogenous tasks from a group (e.g., a pool of passenger vehicles).

Accordingly, at 530 the optimization system 200 bypasses modeling and allocates substantial resources for the computing task, such as when the reservation level $r_n$ indicates an emergency. In one approach, substantially all available computing resources and radio bandwidth to execute object detection are allocated for a critical emergency. In another example, the optimization bypasses modeling and releases substantial resources immediately that are pre-reserved at the timestamp $t_n$.

At 540, the optimization system determines server selection and resources using the characteristics and modeling when the criteria are met. For example, the modeling is MFE modeling. As explained above, MFE can use a numerical process through a mean-field equation and a PDF that evolves. A benefit of MFE is rapidly processing different number of agents (e.g., vehicle or server) at similar speeds. The distribution represents data sizes of voluminous tasks about agent groups operating in a dense area. Furthermore, the optimization system 200 can utilize evolution to control different agent types, such as vehicles and servers, and dynamic changes within agent groups. In one approach, the MFE modeling uses a cost function to minimize the average end-to-end latency of the vehicle $100_n$ among vehicles $100_1$-$100_n$ with server resources as system constraints. In this way, the optimization system 200 efficiently and rapidly determines server selection and resources regardless of the density or volume associated with offloading demands.

Moreover, here the MFE modeling utilizes the mean-field equation and the PDF that evolves to control the varying agent groups of vehicles n and servers m. For example, when vehicle $100_n$ is performing object detection, the optimization system 200 uses MFE modeling to proportionally offload tasks to different edge servers and attain full capacity with balancing. In this way, the optimization system 200 avoids having certain edge servers being overloaded while others are under capacity.

Regarding outputs, the MFE model outputs the parameter $\lambda_{mn}$ representing the proportion of the $n^{th}$ vehicle task assigned to the $m^{th}$ edge server for controlling server selection and task assignment. On the other hand, the output $\mu_{mn}$ represents a computation resource allocated to the $n^{th}$ vehicle in the $m^{th}$ edge server for controlling resource allocation. The optimization system communicates the output to the server and the vehicle $100_n$. The selected server m receives the task (e.g., motion estimates) from the vehicle $100_n$ for remote execution using the allocated resources. Lastly, the server m completes the process by returning executed results of the task.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) levels 0 to 5.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . ." as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An optimization system for offloading tasks, comprising:
   a processor; and
   a memory storing instructions that, when executed by the processor, cause the processor to:
   acquire characteristics of a vehicle and a server for an offloading request, wherein the offloading request is associated with a computing task of the vehicle;
   upon satisfying criteria for optimization associated with execution of the computing task remotely, determine server selection and resource allocation by processing the characteristics using modeling;
   prioritize the offloading request to bypass the modeling when the criteria are unsatisfied, and the criteria includes one of a type of the vehicle and radio resources for the offloading request; and
   communicate the server selection and the resource allocation to the vehicle.

2. The optimization system of claim 1, further including instructions to:
   allocate the radio resources for the computing task when the criteria are unsatisfied.

3. The optimization system of claim 1, further including instructions to:
   estimate, using a mean-field evolution (MFE) model for the modeling, behavior of different offloading demands by groups according to the characteristics; and
   adjust the server selection and the resource allocation according to the groups.

4. The optimization system of claim 1, wherein the characteristics are one of a task size, a transmitter power, an emergency level, a size of computing resources, a reservation level, a timestamp, bandwidth, and a computing capacity.

5. The optimization system of claim 1, further including instructions to adjust, using a mean-field evolution (MFE) model for the modeling, the server selection and the resource allocation according to a Gaussian distribution of the computing task with other tasks associated with size.

6. The optimization system of claim 5, wherein the MFE model is a machine learning (ML) numerical process and the vehicle and the server are different agents in a geographic area associated with the MFE model.

7. The optimization system of claim 1, wherein the computing task is associated with maneuvering the vehicle and the server selection and the resource allocation minimize end-to-end latency for executing the computing task.

8. The optimization system of claim 1, wherein the server selection and the resource allocation are determined concurrently independent of offloading volume in a geographic area.

9. A non-transitory computer-readable medium for offloading tasks comprising:
   instructions that when executed by a processor cause the processor to:
   acquire characteristics of a vehicle and a server for an offloading request, wherein the offloading request is associated with a computing task of the vehicle;
   upon satisfying criteria for optimization associated with execution of the computing task remotely, determine server selection and resource allocation by processing the characteristics using modeling;
   prioritize the offloading request to bypass the modeling when the criteria are unsatisfied, and the criteria includes one of a type of the vehicle and radio resources for the offloading request; and
   communicate the server selection and the resource allocation to the vehicle.

10. The non-transitory computer-readable medium of claim 9, further including instructions to:
    allocate the radio resources for the computing task when the criteria are unsatisfied.

11. The non-transitory computer-readable medium of claim 9, further including instructions to:
    estimate, using a mean-field evolution (MFE) model for the modeling, behavior of different offloading demands by groups according to the characteristics; and
    adjust the server selection and the resource allocation according to the groups.

12. The non-transitory computer-readable medium of claim 9, further including instructions to adjust, using a mean-field evolution (MFE) model for the modeling, the server selection and the resource allocation according to a Gaussian distribution of the computing task with other tasks associated with size.

13. A method, comprising:
acquiring characteristics of a vehicle and a server for an offloading request, wherein the offloading request is associated with a computing task of the vehicle;
upon satisfying criteria for optimization associated with executing the computing task remotely, determining server selection and resource allocation by processing the characteristics using modeling;
prioritizing the offloading request to bypass the modeling when the criteria are unsatisfied, and the criteria includes one of a type of the vehicle and radio resources for the offloading request; and
communicating the server selection and the resource allocation to the vehicle.

14. The method of claim 13, further comprising:
allocating the radio resources for the computing task when the criteria are unsatisfied.

15. The method of claim 13, further comprising:
estimating, using a mean-field evolution (MFE) model for the modeling, behavior of different offloading demands by groups according to the characteristics; and
adjusting the server selection and the resource allocation according to the groups.

16. The method of claim 13, wherein the characteristics are one of a task size, a transmitter power, an emergency level, a size of computing resources, a reservation level, a timestamp, bandwidth, and a computing capacity.

17. The method of claim 13, further comprising:
adjusting, using a mean-field evolution (MFE) model for the modeling, the server selection and the resource allocation according to a Gaussian distribution of the computing task with other tasks associated with size.

18. The method of claim 17, wherein the MFE model is a machine learning (ML) numerical process and the vehicle and the server are different agents in a geographic area associated with the MFE model.

19. The method of claim 13, wherein the computing task is associated with maneuvering the vehicle and the server selection and the resource allocation minimize end-to-end latency for executing the computing task.

20. The method of claim 13, wherein the server selection and the resource allocation are determined concurrently independent of offloading volume in a geographic area.

* * * * *